(12) United States Patent
Qureshi

(10) Patent No.: US 11,328,585 B1
(45) Date of Patent: May 10, 2022

(54) SIMULTANEOUS MULTI-IR CODE PROTOCOL USING PHASE MODULATION

(71) Applicant: Amazon Technologies, Inc., Seattle, WA (US)

(72) Inventor: Faisal Ahmad Qureshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 16/709,603

(22) Filed: Dec. 10, 2019

(51) Int. Cl.
*G08C 23/04* (2006.01)
*H04B 10/556* (2013.01)
*H04N 21/422* (2011.01)

(52) U.S. Cl.
CPC ......... *G08C 23/04* (2013.01); *H04B 10/5561* (2013.01); *H04N 21/42204* (2013.01); *G08C 2201/92* (2013.01); *H04N 21/42221* (2013.01)

(58) Field of Classification Search
None
See application file for complete search history.

(56) References Cited

U.S. PATENT DOCUMENTS

| | | | | |
|---|---|---|---|---|
| 4,850,040 A * | 7/1989 | Teich | ..................... | G08C 23/04 398/112 |
| 2002/0101357 A1 * | 8/2002 | Gharapetian | .......... | H04B 1/202 340/12.22 |
| 2002/0129289 A1 * | 9/2002 | Sato | ...................... | G06F 1/1616 713/340 |
| 2007/0013775 A1 * | 1/2007 | Shin | ....................... | G08C 17/02 348/114 |
| 2007/0223048 A1 * | 9/2007 | Misawa | .................. | H04N 1/21 358/302 |
| 2008/0253472 A1 * | 10/2008 | Griep | ................... | H04B 10/114 375/295 |
| 2011/0140833 A1 * | 6/2011 | Seo | ......................... | G08C 23/04 340/4.3 |
| 2011/0140948 A1 * | 6/2011 | Friedman | ......... | H04N 21/42204 341/176 |
| 2012/0223820 A1 * | 9/2012 | Park | ...................... | G05B 15/02 340/12.52 |
| 2013/0106738 A1 * | 5/2013 | Kim | ................. | H04N 21/42208 345/173 |
| 2019/0090312 A1 * | 3/2019 | Zhou | ................... | H04W 88/085 |

* cited by examiner

*Primary Examiner* — David W Lambert
(74) *Attorney, Agent, or Firm* — Eversheds Sutherland (US) LLP

(57) ABSTRACT

Systems, methods, and computer-readable media are disclosed for systems and methods for simultaneously sending a single signal comprising distinct instructions for two separate devices. Example methods may include receiving, by a control device instructions to adjust the operation of a first device and a second device, generating a single signal corresponding to the received instructions for two separate devices, and simultaneously sending the single signal to the two separate devices causing the devices to perform the distinct instructions intended for each respective device.

16 Claims, 8 Drawing Sheets

US 11,328,585 B1

SIMULTANEOUS MULTI-IR CODE PROTOCOL USING PHASE MODULATION

BACKGROUND

Signals such as infrared radiation (IR) signals may be transmitted to various devices such as televisions, speaker systems, lighting systems, digital tuners, and the like, to control one or more of these devices. For example, a user may use a remote control to power on a television, change the volume on the speaker system, dim the lights, and/or select a television station. However, users may desire to simultaneously transmit two signals at the same time to control two different devices and cause the devices to perform actions on each respective device (e.g., mute volume on speaker system and television).

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
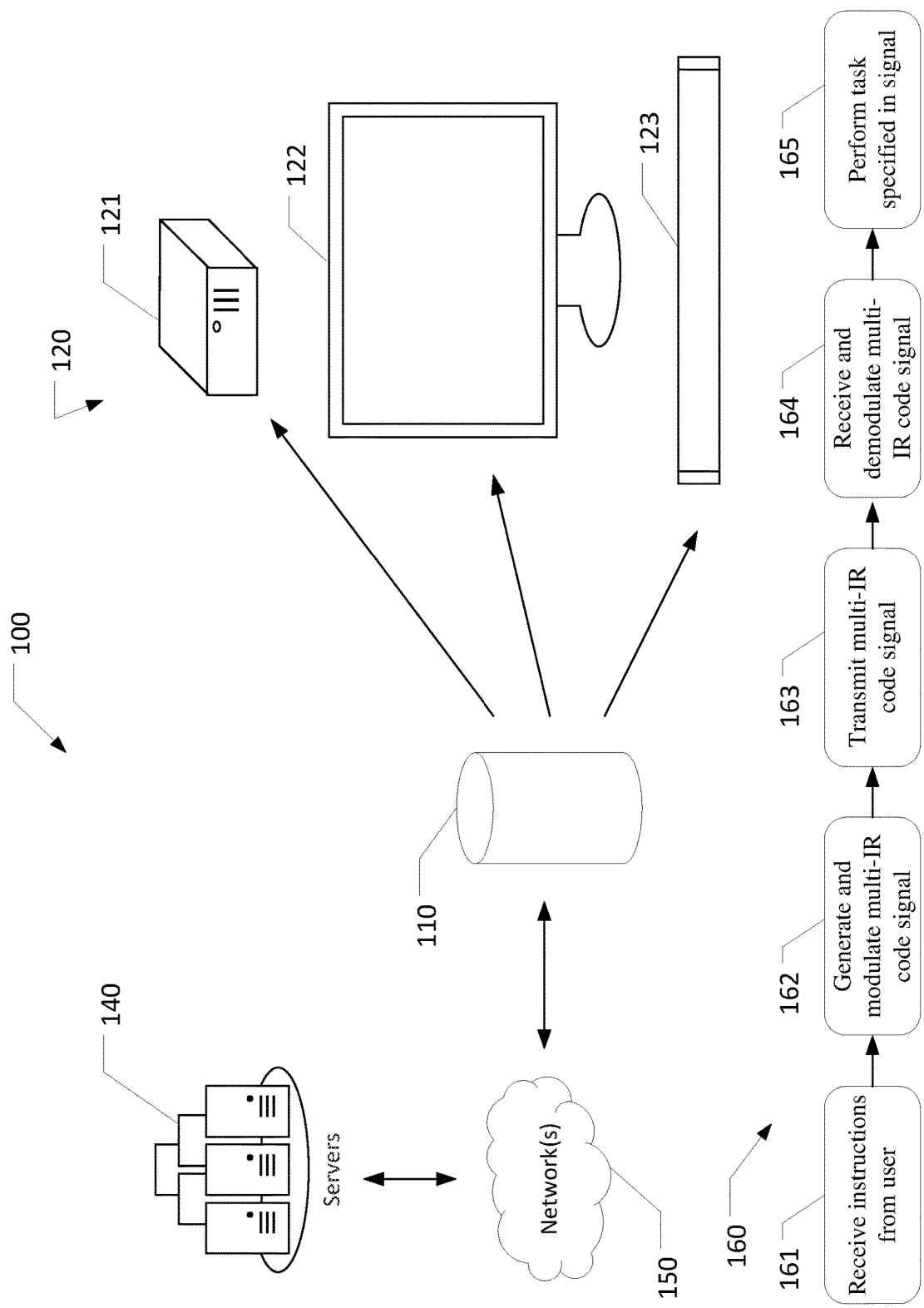
FIG. 1 is a schematic illustration of an example use case for simultaneously transmitting multiple signals to more than one device in accordance with one or more example embodiments of the disclosure.

Signals, such as infrared radiation (IR) signals, may be simultaneously transmitted from control devices to electronic devices and may be received and processed by electronic devices to control the operation the electronic devices. Electronic devices may include, for example, televisions, computing devices, speaker systems involving one or more speakers, lighting systems involving one or more lights, a digital tuner or cable box, and/or other devices that may receive and process signals (e.g., garage door openers and security systems.) For example, a control device may transmit a signal to mute a speaker system and a television. Because these systems typically are located in close proximity to one another, signal interference may occur, preventing an electronic device from receiving from receiving the signal and performing an intended operation.

It may be desirable to transmit two signals simultaneously for operations that are best performed contemporaneously. For example, if a user is watching a movie on a television and sound from the movie is generated by the television and a separate sound system, it may be desirable for the television and the sound system to change volume at the same time. Specifically, muting the sound, increasing the volume, and decreasing the volume should be performed at the same time. Other examples of operations that are best performed contemporaneously include powering the television and the sound system at the same time or powering the television and the digital tuner at the same time.

Control devices may include devices such as remote controls, computing devices, and/or smart devices configured to receive user input, generate signal based on the user input, and transmit the signal to electronic devices. The control device may include a microphone, a touchscreen, input buttons, and/or another well known features and/or components for user input. For example, a control device may be a smart device such as the Amazon Echo device including a microphone for user input and voice recognition capabilities. Alternatively, a control device may include a remote control that uses a touch screen, buttons and/or sliders to collect user input.

A user may input instructions to the control device that may involve multiple devices. For example, a user may instruct a control device to increase volume on the television and speaker system. The control device may transmit a signal to the speaker system and the television to increase volume. This signal may be an IR signal. A user may provide additional contextual information during set-up of the control device or an application corresponding to the control device. Where contextual information is provided, the user need only command the control device to increase volume, and the control device may know to that the command requires the television and the sound speaker to increase volume.

To avoid interference, the control device may combine two signals and/or two data streams into a single signal such that the signals and/or data streams are simultaneously transmitted. For example, the control device may receive the user input and generate two byte streams corresponding to the user input. Each byte stream may be intended for a different electronic devices (e.g., television and speaker system) and may cause the respective electronic device to perform an action (e.g., increase volume). The signal maybe modulated and transmitted in a single signal (e.g., single IR signal). The signal may include a handshaking portion including the address of each intended device and demodulation instructions for each intended device. Upon receipt of the signal, each device may demodulate the signal based on the handshaking packet and may perform an action corresponding to the demodulated signal.

Embodiments of the disclosure include systems and methods for generating a single signal by combining two modulated signals. For example, a control device may receive one or more instructions from a user. The instructions may correspond to a first device and a second device. The control device may generate a first byte stream and a second byte stream corresponding to the one or more instructions from the user. A carrier signal may be obtained or generated by the control device and split into two identical carrier signals. The carrier signals may have a frequency of 38 kHz to corresponding to IR. The control device may modulate each carrier signal to generate two modulated carrier signals. The first carrier signal may be modulated based on the first byte stream and may be modulated using 0 and 180 degree phases (e.g., using binary phase shift keying (BPSK)). The second carrier signal may be modulated based on the second byte stream and may be modulated using 90 and 270 degree phases. The two modulated signals may then be combined into a combined modulated signal having the same frequency as the carrier signal. The combined modulated signal may then be transmitted by the control device such that the first byte stream and second byte stream are transmitted simultaneously. Upon receipt of the signal, each device may demodulate the signal based on a handshaking portion of the signal and may perform an action corresponding to the demodulated signal.

Embodiments of the disclosure may alternatively include systems and methods for generating a single signal by combining two byte streams. Embodiments of the disclosure include systems and methods for generating a single byte stream by combining two byte streams. For example, a control device may receive one or more instructions from a user. The control device may generate a first byte stream and a second byte stream corresponding to one or more instructions from a user and may combine the first byte stream and the second byte stream into a combined byte stream having two bits a piece. A carrier signal having a certain frequency (e.g., 38 kHz) may be obtained or generated. The carrier signal may then be modulated based on combined byte stream using 0 and 180 degree phases as well as 90 and 270 degree phases (e.g., using quadrature phase shift keying (QPSK)). The combined modulated signal may then be transmitted by the control device such that the first byte stream and second byte stream are transmitted simultaneously. Upon receipt of the signal, each device may demodulate the signal based on the handshaking portion of the signal and may perform an action corresponding to the demodulated signal. It is understood that other phase shift keying approaches may similarly be employed.

Referring to FIG. 1, an example use case 100 for simultaneously transmitting multiple byte streams (e.g., codes) is depicted in accordance with one or more example embodiments of the disclosure. In the illustrated example, a user may send and/or input instructions to a control device 110, which may be a remote control device, to adjust the operation of one or more electronic devices 120. A signal corresponding to the instructions may be sent by the control device 110 may be received by electronic devices 120. The signal may include instructions corresponding to the operation of two different electronic devices 120. An electronic device may identify instructions in the signal intended for that device and may perform an action based on the instructions. For example, a user may instruct the control device, via a voice command, to increase the volume on the speaker and the television and the control device may simultaneously transmit instructions to increase the volume on the speaker and the television.

The control device 110 may include the hardware and software components described below with respect to FIGS. 6 and 7. As explained above, the control device 110 may include a microphone, a touchscreen, input buttons, and/or another well-known features for generating and/or receiving input from a user. For example, the control device 110 may include a microphone and may receive voice commands from a speaker. Alternatively, or in addition to, the control device 110 may include buttons and/or a touchscreen which may be engaged by a user to input instructions. In this example, the instructions may involve increasing a volume. The control device 110 may further communicate and coordinate with one or more devices to perform one or more operations or actions. For example, the control device 110 may communicate with a separate IR transmitter (e.g., IR blaster) for sending an IR signal. Alternatively, or in addition, the control device 110 may communicate and coordinate with one or more servers to perform one or more operations or actions described herein (e.g., on the cloud). In another example, the control device 110 may be one or more devices that collectively perform the tasks and operations described herein with respect to the control device 110. For example, user input may be received on a first device and one or more steps set forth in FIG. 2 or 4 may be performed on a second device (e.g., transmitting the modulated signal).

The instructions received from a user may include enough contextual information to inform the control device 110 of the electronic devices 120 for which the instructions are intended. Control device may know the addresses (e.g., MAC Address) of each electronic device 120 and/or may acquire the address by pairing with each electronic device 120. Alternatively, or in addition, control device 110 may communicate with one or more servers 140 over the Internet via one or more networks 150. One or more servers 140 may store the address of electronic devices 120, which may be accessed by the control device 110.

As shown in FIG. 1, electronic devices 120 may include television 122 which may be a smart television, sound system 123 which may be a sound bar, and digital tuner 121 which may be a cable box for selecting television stations and/or media content to be displayed on the television 122 and played on the speakers of television 122 and the sound system 123. While three electronic devices are illustrated in FIG. 1, it is understood that any number of electronic devices may be included in use case 100. For example, use case 100 may include fewer or more than three devices and/or may include any combination of electronic different devices, including more than one of the same type of device.

Control device 110 and electronic devices 120 may communicate via any well-known wireless technology such as Bluetooth, WiFi, ZigBee, Near Field Communication, or another suitable wireless connection protocol. Control device and electronic devices 120 preferably communicate at least via IR signals. For example, control device 110 may include an IR signal generator for modulating an IR signal and an IR transmitter and electronic devices 120 may include an IR receiver and an processor for demodulating an IR transmitter. In this manner, the control device 110 may generate and transmit IR signals and the electronic devices may receive and process the IR signal and perform an action based on the IR signal.

To initiate a simultaneous change in operation at the electronic devices in response to a signal having instructions for two different devices, an example process flow 160 is presented. As explained in greater detail below with respect to FIGS. 6 and 7, the control device 110 may include at least one memory that stores computer-executable instructions and at least one processor configured to access the at least one memory and execute the computer-executable instructions to perform various actions or operations, such as one or more of the operations in the process 160 of FIG. 1.

At a first block 161, control device 110 may receive instructions from a user. The instructions may be input using any well-known approach including, for example, voice commands or input from a touch screen and/or buttons. As explained above, control device 110 may use contextual information stored on or more servers 140 and/or stored on control device 110 or other computing devices in communication with control device 110 to provide context for the instructions received from the user. For example, if control device 110 receives a voice command to increase volume, contextual information may inform control device 110 that television and sound system are currently playing audio. Based on this contextual information, control device 110 may interpret the command to "increase volume" to mean increase volume on both the television and the speaker system.

At the second block 162, the control device 110 may generate multiple byte streams corresponding to the instructions from the user and/or interpreted instructions based on contextual information. For example, control device 110 may generate two byte systems, a first byte stream intended to cause a first device to perform one or more operations corresponding to the instructions and a second byte stream intended to cause a second device to perform one or more operations corresponding to the instructions. Second block 162 may further involve modulating the byte streams and generating a single signal containing both byte streams. For example, an IR signal may be generated having multiple IR codes.

At the third block 163, the control device 110 may transmit the single signal. For example, where an IR signal is generated, the control device 110 may transmit the IR signal corresponding to byte streams via an IR transmitter, also known as an IR blaster. The transmitted signal may include a handshaking packet including information about the addresses of the intended recipients and demodulation instructions for each intended recipient. As the signal may be transmitted indiscriminately to nearby devices, the handshaking packet may be used to inform the intended recipient that the signal includes information for that device.

At the fourth block 164, the electronic devices 120 within range of the control device 110 may receive the signal transmitted by the control device 110. An electronic device 120 may process the handshaking packet and determine if the signal is intended for that device. If the signal is intended for that device, the electronic device 120 will demodulate the signal according to the handshaking packet. For example, the electronic device 120 may include an IR receiver and may demodulate the multi-IR code signal based on the handshaking packet.

At the fifth block 165, the electronic device that received and demodulated the signal may perform one or more tasks, actions and/or operations corresponding to the demodulated signal. For example, television 122 and sound system 123 may receive an IR signal intended for each device, demodulate the signal according to the handshaking packet and adjust the volume according to the instructions in the signal. The receipt, demodulation, and operation performed on each device may happen simultaneously on television 122 and sound system 123 such that the operation of adjusting the volume is performed at the same time or nearly at the same time.

While three electronic devices are illustrated in FIG. 1, it is understood that any number of electronic devices may be included in use case 100. For example, use case 100 may include fewer or more than three devices and/or may include any combination of electronic devices 120, including more than one of the same type of device. Further, while FIG. 1 illustrates control device 110 as control device 650 described in greater detail below with respect to FIG. 6, it is understood that the control device 110 may be control device 750 or any other device having similar functionality.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
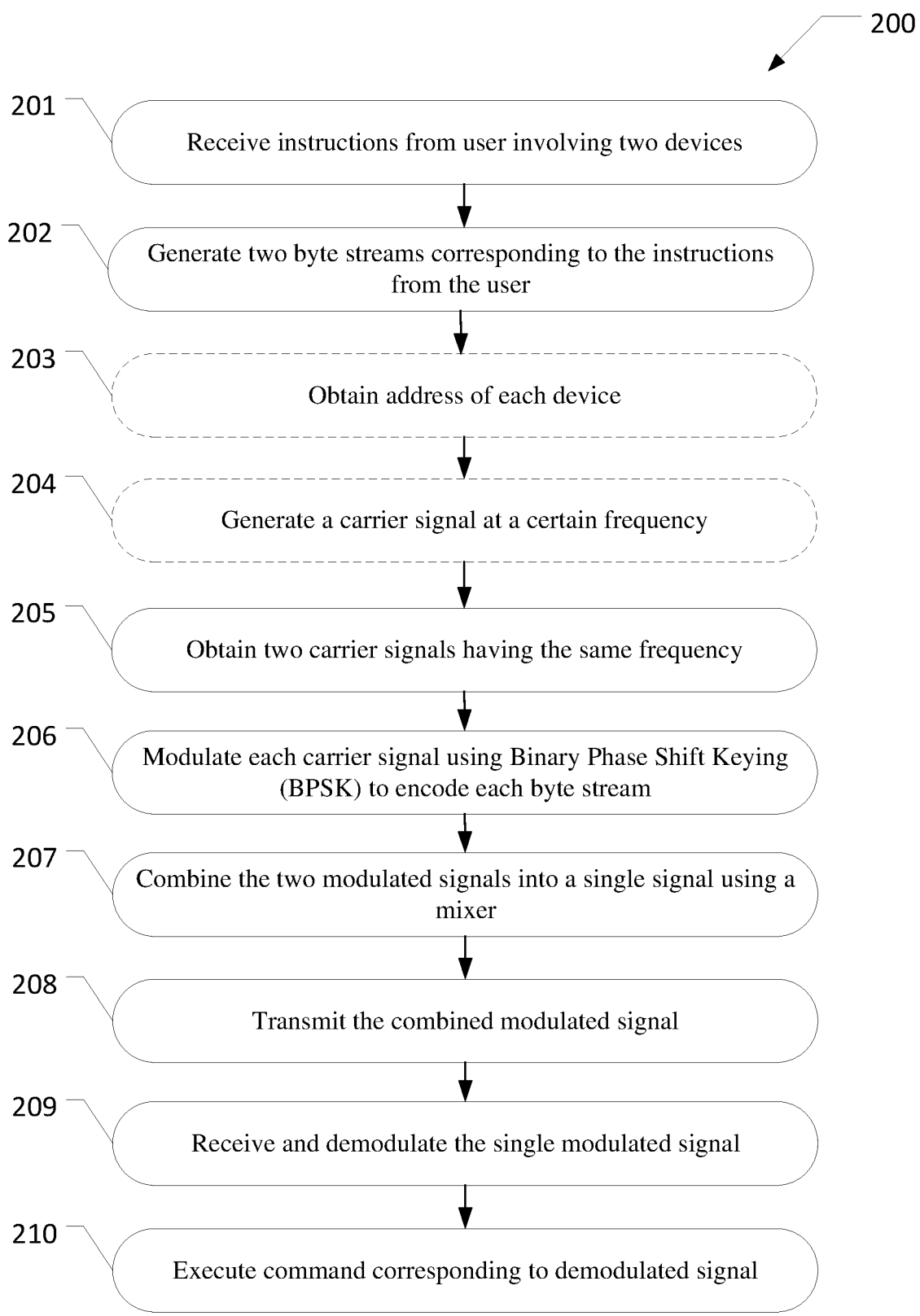
FIG. 2 is a schematic illustration of an example process flow for combining two signals and simultaneously transmitting the two signals in a combined signal in accordance with one or more example embodiments of the disclosure.

FIG. 2 depicts an example process flow 200 for modulating signals intended for different devices using Binary Phase Shift Keying (BPSK) and simultaneously transmitting a combined modulated signal in accordance with one or more example embodiments of the disclosure. Some or all of the blocks of the process flows in this disclosure may be performed in a distributed manner across any number of devices. The operations of the process flow 200 may be optional and may be performed in a different order.

At block 201 of the process flow 200, computer-executable instructions stored on a memory of a device, such control device 110, may be executed to receive instructions from a user involving two different electronic devices 120. For example, control device 110 may include a microphone which may capture a voice command of a user and may use voice recognition technology to interpret the voice command. As explained above, control device 110 may use contextual information stored on or more servers 140 and/or stored on control device 110 or other computing devices in communication with control device 110 to provide context for the instructions received from the user. Based on the input received from the user and/or the contextual information, control device 110 may identify at least one operation to be performed on the two electronic devices 120 corresponding to the input from the user. In another example, user input may be communicated to control device 110 using a touch screen and/or buttons on control device 110 (e.g., using control device 750). Examples of input from the user include commands to turn on/off power, adjust volume, and turn on and tune to a particular station.

At block 202 of the process flow 200, computer-executable instructions stored on a memory of a device, such as control device 110, may be executed to generate a first byte stream corresponding to instructions from the user intended for a first device and a second byte stream corresponding to instruction from the user intended for a second device. Each byte stream may cause an electronic device 120 to perform one or more tasks, operations, and/or actions. Also at block 202 of the process flow 200, computer-executable instructions stored on a memory of a device, such as control device 110, may be executed to generate a handshaking byte stream or packet. The computer executable code executed at block 202 may be code module 628 or code module 728.

The handshaking byte stream or packet may include the address (e.g., MAC address or other unique identifier for each electronic device 120) of the first device and second device and demodulation instructions for the first device and the second device. If control device 110 does not already know the address of the first device and/or the second the control device 110, at optional block 203 of the process flow 200, computer-executable instructions stored on a memory of a device, such as control device 110, may be executed to obtain the address (e.g., from the one or more servers 140). Electronic devices 120 may need to be registered and/or paired with control device 110. The address information obtained from electronic devices 120 may stored locally on the control device 110 and/or on the one or more servers 140.

At optional block 204 of the process flow 200, computer-executable instructions stored on a memory of a device, such as control device 110, may be executed to generate a carrier signal at a certain frequency. The carrier signal may be any signal that may be modulated to encode a byte stream. The carrier signal may have a frequency of 38 kHz such that the signal may be transmitted as an IR signal. Alternatively, the carrier signal may have any other frequency. In another example, the carrier signal may be obtained from a different device in communication with control device 110. The computer executable code executed at block 204 may be carrier signal generator module 626 or carrier signal generator module 726.

At block 205 of process flow 200, computer-executable instructions stored on a memory of a device, such as control device 110, may be executed to obtain two carrier signals each having the same frequency. Where a carrier signal is generated or obtained at optional block 204, the carrier signal may be split into two identical carrier signals having the same frequency. Alternatively at block 205, two identical carrier signals having the same frequency may be obtained from different device. For example, the identical carrier signals may have a frequency of 38 kHz. The computer executable code executed at block 205 may be carrier signal generator module 626 or carrier signal generator module 726.

At block 206 of process flow 200, computer-executable instructions stored on a memory of a device, such as control device 110, may be executed to modulate each carrier signal using BPSK to encode each byte stream and generate two modulated signals. Specifically, the first byte stream may be encoded by one carrier signal and the second byte stream may be encoded by the second carrier signal. Using BPSK the different carrier signals may be modulated using different phase pairs. For example, the first carrier signal may be modulated using 0 and 180 degrees and the second carrier signal may be modulated using 90 and 270 degrees, or vice versa. In this manner each carrier signal may be modulated as 0s or 1s. Also, modulating each signal using different phase pairs will avoid destructive interference. The computer executable code executed at block 206 may be phase shift keying modulation module 630 or phase shift keying modulation module 730.

At block 207 of process flow 200, computer-executable instructions stored on a memory of a device, such as control device 110, may be executed to combine the two modulated signals into a combined modulated signal. The combined modulated signal may have the same frequency as the two modulated signals. The two modulated signals may be combined using a signal mixer that is designed to combine two different signals that have been modulated using different phase pairs using BPS K. For example, the two modulated signals may be combined using mixer 619 or mixer 719. The computer executable code executed at block 207 may be signal combiner module 634 or signal combiner module 734.

At block 208 of process flow 200, computer-executable instructions stored on a memory of a device, such as control device 110, may be executed to transmit the combined modulated signal. The combined modulated signal may be transmitted by transceiver 612 or 612 and antenna 634 and 734. The computer executable code executed at block 208 may be communication module 636 or may be communication module 736.

At block 209 of process flow 200, computer-executable instructions stored on a memory of a device, such as electronic device 120, may be executed to receive the combined modulated signal and process the handshaking packet to determine if the signal is intended for that electronic device 120. If it is determined that the signal is determined for that electronic device 120, the electronic device 120 will demodulate the combined modulated signal based on the demodulation instructions in the handshaking packet. For example, the demodulation instructions may instruct the electronic device 120 to demodulate the packet using phase pairs 0 and 180 or, alternatively, phase pairs 90 and 270. It is understood that the electronic device may demodulate a signal according to phase pairs identified in the handshaking packet or using the most significant bit (MSB) or least significant bit (LSB) identified in the handshaking packet. Further, the electronic device 120 may alternate between demodulating using phase pairs and demodulating using LSB/MSB. For example, a first signal received by the electronic device may instruct the electronic device to demodulate using certain phase pairs and a subsequent signal may instruct the electronic device to demodulate using MSB or LSB. The electronic device may receive a reset packet from the control device 110 instructing the electronic device to revert to default modulation settings and/or techniques, facilitating the transition from one demodulation approach (e.g., using phase pairs) to a different demodulation approach (e.g., MSB/LSB). The computer executable code executed at block 209 by the electronic device may be the signal module(s) 826 and/or the demodulation module(s) 828.

At block 210 of process flow 200, computer-executable instructions stored on a memory of a device, such as electronic device 120, may be executed to perform an action, operation, and/or task corresponding to the demodulated signal. For example, the signal transmitted to the electronic devices 120 may instruct the electronic devices 120 to power on/off, adjust volume, change a station or otherwise alter media content played or displayed and/or perform any other action, operation, and/or task on electronic device 120. It is understood that the control device 110 may communicate and coordinate with one or more servers to perform one or more operations or actions described with respect to FIG. 2 (e.g., on the cloud).

Figure 3:
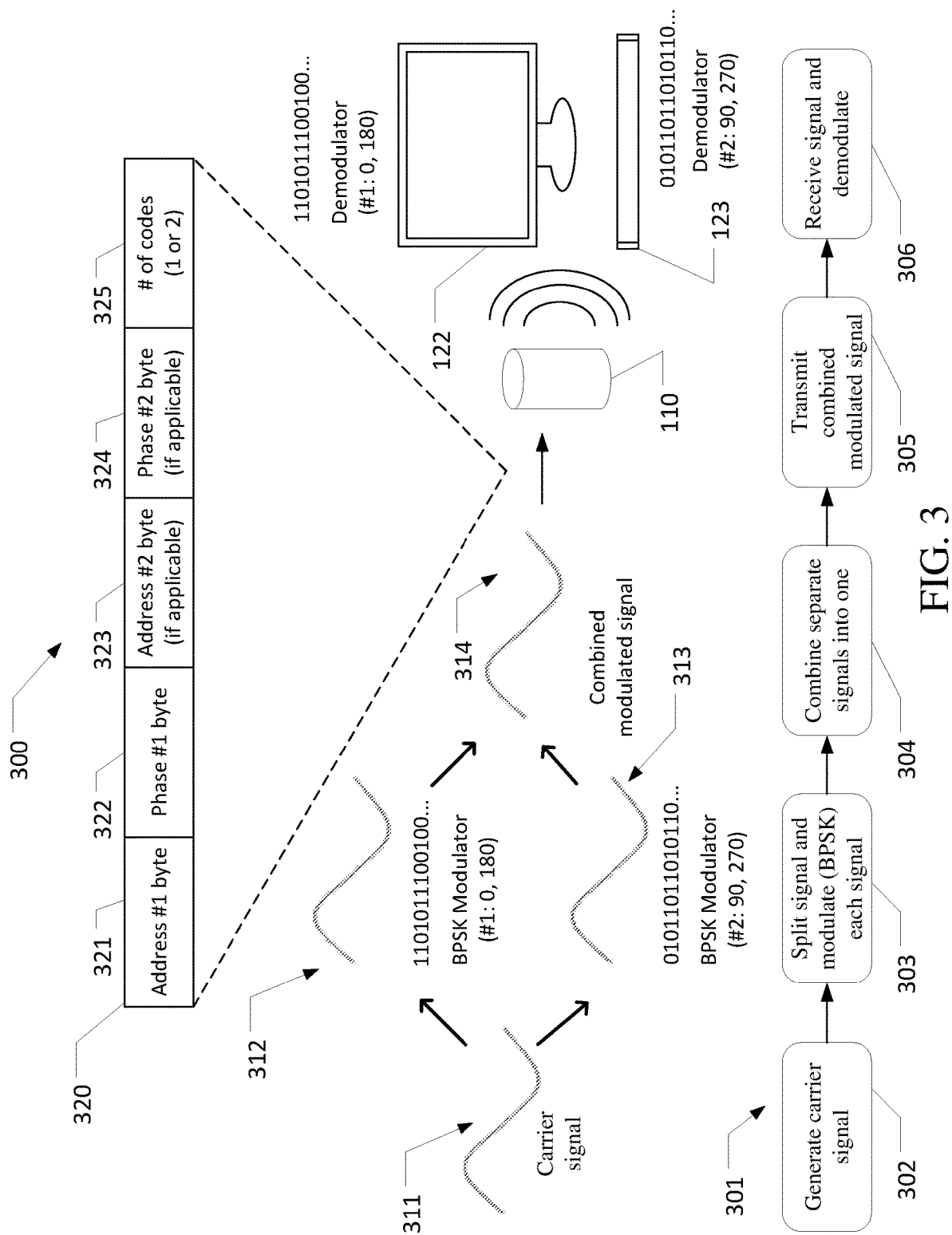
FIG. 3 is a schematic illustration of an example use case for combining two signals and simultaneously transmitting the two signals in accordance with one or more example embodiments of the disclosure.

FIG. 3 is a schematic illustration of an example use case 300 for modulating signals intended for different devices using Binary Phase Shift Keying (BPSK) and simultaneously transmitting a combined modulated signal in accordance with one or more example embodiments of the disclosure. Different embodiments may include different, additional, or fewer entries than those illustrated in the example of FIG. 3.

In FIG. 3, the control device 110 may include at least one memory that stores computer-executable instructions and at least one processor configured to access the at least one memory and execute the computer-executable instructions to perform various actions or operations, such as one or more of the operations in the process flow 301.

At a first block 302, control device 110 may generate a carrier signal 311. For example, carrier signal 311 may be generated by control device 110 running carrier signal generator module 626 or carrier signal generator module 726. Alternatively, the carrier signal 311 may be obtained by control device 110 from a different device.

At second block 302, the carrier signal 301 may be split into two identical carrier signals, first carrier signal 312 and second carrier signal 313, each carrier signal have the same frequency. The carrier signal 311 may be split into two identical carrier signals by control device 110 running carrier signal generator module 626 or signal generator module 726. Also, at second block 302, the first carrier signal 311 and the second carrier signal 312 may be modulated using Binary Phase Shift Keying (BPSK). For example, the first carrier signal and second carrier signal may be modulated by control device 110 using phase shift keying modulation module 630 or phase shift keying modulation module 730 to generate a first modulated signal and a second modulated signal. The first carrier signal may be modulated using phase pairs 0 degrees and 180 degrees. The second carrier signal may be modulated using phase pairs 90 and 270 degrees. Alternatively, the first carrier signal may be modulated using phase pairs 90 and 270 and the second carrier signal may be modulated using phase pairs 0 and 180 degrees. Modulating the first carrier signal 312 may encode the first carrier signal 312 with a first byte stream. Modulating the second carrier signal 313 may encode the second carrier signal 313 with a first byte stream.

At third block 304, the first modulated signal 312 and the second modulated signal 313 may be combined to generate a combined modulated signal 314. The first modulated signal 312 and the second modulated signal 313 may be combined using mixer 619 or mixer 719. Also, control device 110 may execute signal combiner module 617 or 717 to generate the combined modulated signal.

At fourth block 305, the combined modulated signal 314 may be transmitted via the control device. For example, control device 110 may run communication module 636 or communication module 736 to transmit the combined modulated signal via transceiver 612 or 712 and antenna 634 or antenna 734, respectively. The signal transmitted at block 305 may include handshaking packet 320. As the transmitted signal may be transmitted indiscriminately to devices within range of antenna 634 or antenna 734, the handshaking packet may include device address information, phase information for demodulation and/or the number of codes or byte streams comprising operation, task, and/or action instructions.

Handshaking packet 320 may include address byte 321 that corresponds to an address and/or unique identifier (e.g., MAC address) of a first electronic device 120 (e.g., television 122) as well as a phase byte 322 that corresponds to a phase pair for demodulating the signal at the first electronic device 120. The handshaking packet 320 may also include address byte 323 that corresponds to an address and/or unique identifier (e.g., MAC address) of a second electronic device 120 (e.g., sound system 123) as well as a phase byte 324 that corresponds to a phase pair for demodulating the signal at the second electronic device 120. The handshaking packet may further include number of codes byte 325 including information about the number of byte streams of and/or signals corresponding to byte streams that are included in the signal.

At fifth block 306, the combined modulated signal 314 may be received by electronic device 120. For example, television 122 and sound system 123 may receive the combined modulated signal 314. Upon receipt of the combined modulated signal 314, each electronic device may demodulate the combined modulated signal according to the handshaking packet. For example, a first device (e.g., television 122) may determine that is an intended recipient of the combined modulated signal according to address byte 321 and may demodulate the combined modulated signal via BPSK according to phase byte 322 which may indicate phase pairs of 0 and 180 degrees. Additionally, a second device (e.g., sound system 123) may determine that it is an intended recipient of the combined modulated signal according to address byte 323 and may demodulate the combined modulated signal via BPSK according to phase byte 324 which may indicate phase pairs of 90 and 270 degrees. Though control device 650 and television 122 and sound speaker 123 are illustrated in FIG. 3, it is understood that any control device 110 may send the modulated signal 514 to any electronic devices 120.

Figure 4:
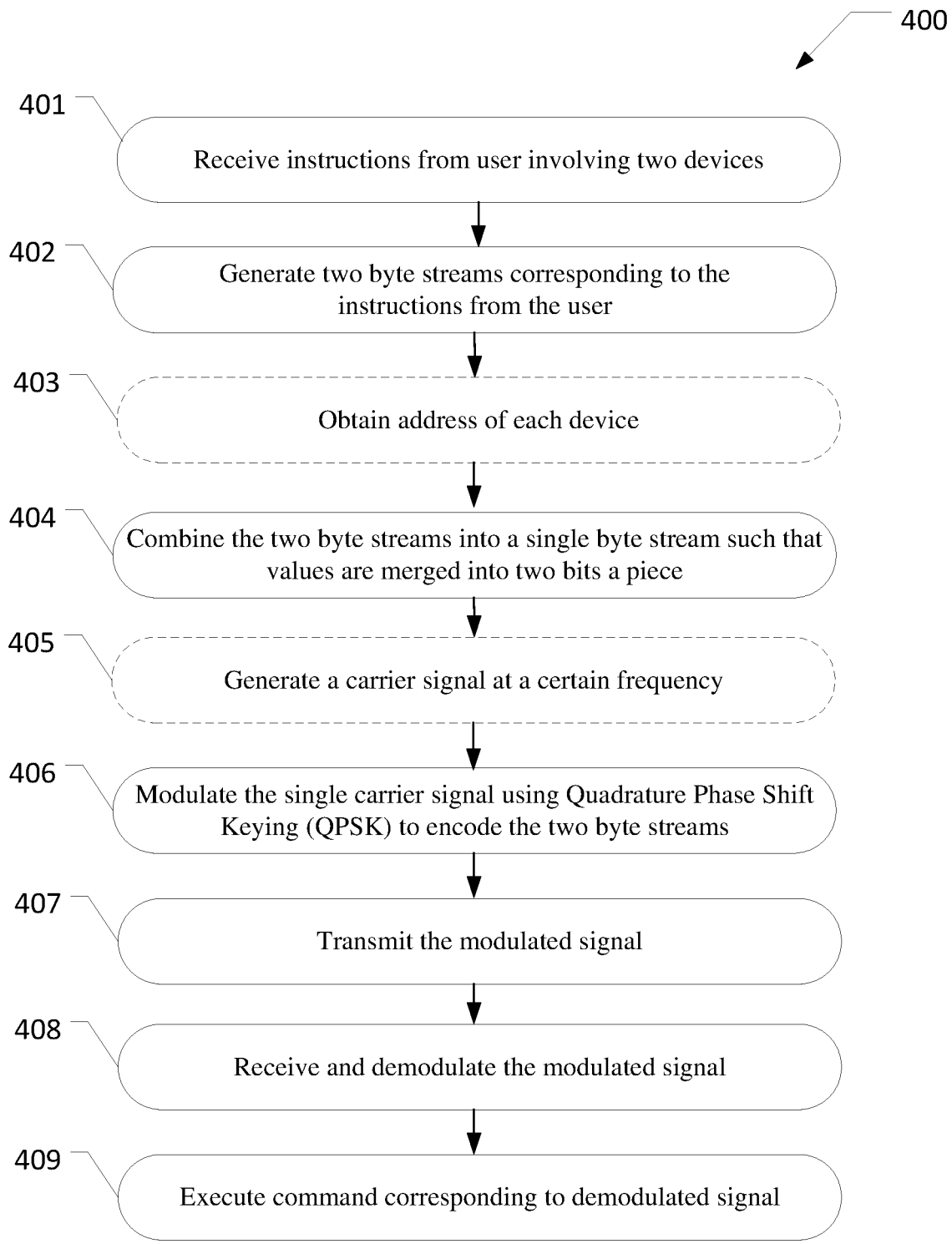
FIG. 4 is a schematic illustration of an example process flow for combining two data streams and simultaneously transmitting the two data streams in accordance with one or more example embodiments of the disclosure.

FIG. 4 depicts an example process flow 400 for modulating signals intended for different devices using QPSK and simultaneously transmitting a modulated signal in accordance with one or more example embodiments of the disclosure. Some or all of the blocks of the process flows in this disclosure may be performed in a distributed manner across any number of devices. The operations of the process flow 400 may be optional and may be performed in a different order.

At block 401 of the process flow 400, computer-executable instructions stored on a memory of a device, such control device 110, may be executed to receive instructions from a user involving two different electronic devices 120. Block 401 may be the same or substantially the same as block 201 of FIG. 2. At block 402 of the process flow 200, computer-executable instructions stored on a memory of a device, such as control device 110, may be executed to generate a first byte stream corresponding to instructions from the user intended for a first device and a second byte stream corresponding to instruction from the user intended for a second device. Block 402 may be the same or substantially the same as block 202 of FIG. 2. Also at block 402 of the process flow 400, computer-executable instructions stored on a memory of a device, such as control device 110, may be executed to generate a handshaking byte stream or packet.

The handshaking packet generated at block 402 may include the address (e.g., MAC address or other unique identifier) of the first device and second device. If the control device 110 does not already know the address of the first device and/or the second the control device 110, at optional block 403 of the process flow 400, computer-executable instructions stored on a memory of a device, such as control device 110, may be executed to obtain the address from the one or more servers 140. As explained above with respect to block 203 of FIG. 2, electronic devices 120 may need to be registered and/or paired with control device 110. The address information corresponding to electronic devices 120 may stored locally on the control device 110 and/or on the one or more servers 140. The handshaking packet may further include demodulation information for the first device and second device. For example the, handshaking packet may instruct the first device to demodulate the received signal using the most significant bit (MSB) and may instruct the second device to demodulate the received signal using the least significant bit (LSB).

At block 404 of the process flow 400, computer-executable instructions stored on a memory of a device, such control device 110, may be executed to combine the first byte stream and the second byte stream. For example, the control device 110 may run code combiner module 632 or code combiner module 732 to combine the first byte stream and the second byte stream to generate a combined byte stream. Code combiner module 632 or code combiner module 732 may be designed to take two separate byte streams and combine them into a merged byte stream having two bits per piece.

At optional block 405 of the process flow 400, computer-executable instructions stored on a memory of a device, such control device 110, may be executed to generate a carrier signal at a certain frequency. Block 405 may be the same or substantially the same as block 204. At block 406 of process flow 400, computer-executable instructions stored on a memory of a device, such as control device 110, may be executed to modulate the carrier signal using QPSK to encode the carrier signal based on the combined byte stream. As explained above, using QPSK, the carrier signal may then be modulated based on the combined byte stream using 0 and 180 degree phases as well as 90 and 270 degree phases. Unlike the approach described above with respect to FIG. 2, here these is no need to generate two carrier signals and modulate two separate signals. There is also no need to combine the two modulated signals and thus a mixer designed for this purpose is not required for the approach illustrated in FIG. 4. The computer executable code executed at block 406 may be phase shift keying modulation module 630 or phase shift keying modulation module 730.

At block 407 of process flow 400, computer-executable instructions stored on a memory of a device, such as control device 110, may be executed to transmit the modulated signal representing the combined byte streams. Block 507 may be the same or substantially the same as block 208 of FIG. 2. At block 408 of process flow 400, computer-executable instructions stored on a memory of a device, such as electronic device 120, may be executed to receive the combined modulated signal and process the handshaking packet to determine if the signal is intended for that electronic device 120. If it is determined that the signal is determined for that electronic device 120, the electronic device 120 will demodulate the combined modulated signal based on the demodulation instructions in the handshaking packet. For example, the demodulation instructions may instruct the electronic device 120 to demodulate the packet using LSB or MSB. It is understood that the electronic device may demodulate a signal using the most significant bit (MSB) or least significant bit (LSB) identified in the handshaking packet or according to phase pairs identified in the handshaking packet. Further, the electronic device may alternate between demodulating using phase pairs and demodulating using LSB/MSB. For example, a first signal received by the electronic device may instruct the electronic device to demodulate using certain phase pairs and a subsequent signal may instruct the electronic device to demodulate using MSB or LSB. The electronic device 120 may receive a reset packet from the control device 110 instructing the electronic device 120 to revert to default modulation settings and/or techniques, facilitating the transition from one demodulation approach (e.g., using phase pairs) to a different demodulation approach (e.g., MSB/LSB). The computer executable code executed at block 409 by the electronic device 120 may be the signal module(s) 826 and/or the demodulation module(s) 828. At block 409 of process flow 400, computer-executable instructions stored on a memory of a device, such as electronic device 120, may be executed to perform an action, operation, and/or task corresponding to the demodulated signal. This step may be the same or substantially the same as block 210 of FIG. 2. It is understood that the control device 110 may communicate and coordinate with one or more servers to perform one or more operations or actions described with respect to FIG. 4 (e.g., on the cloud).

Figure 5:
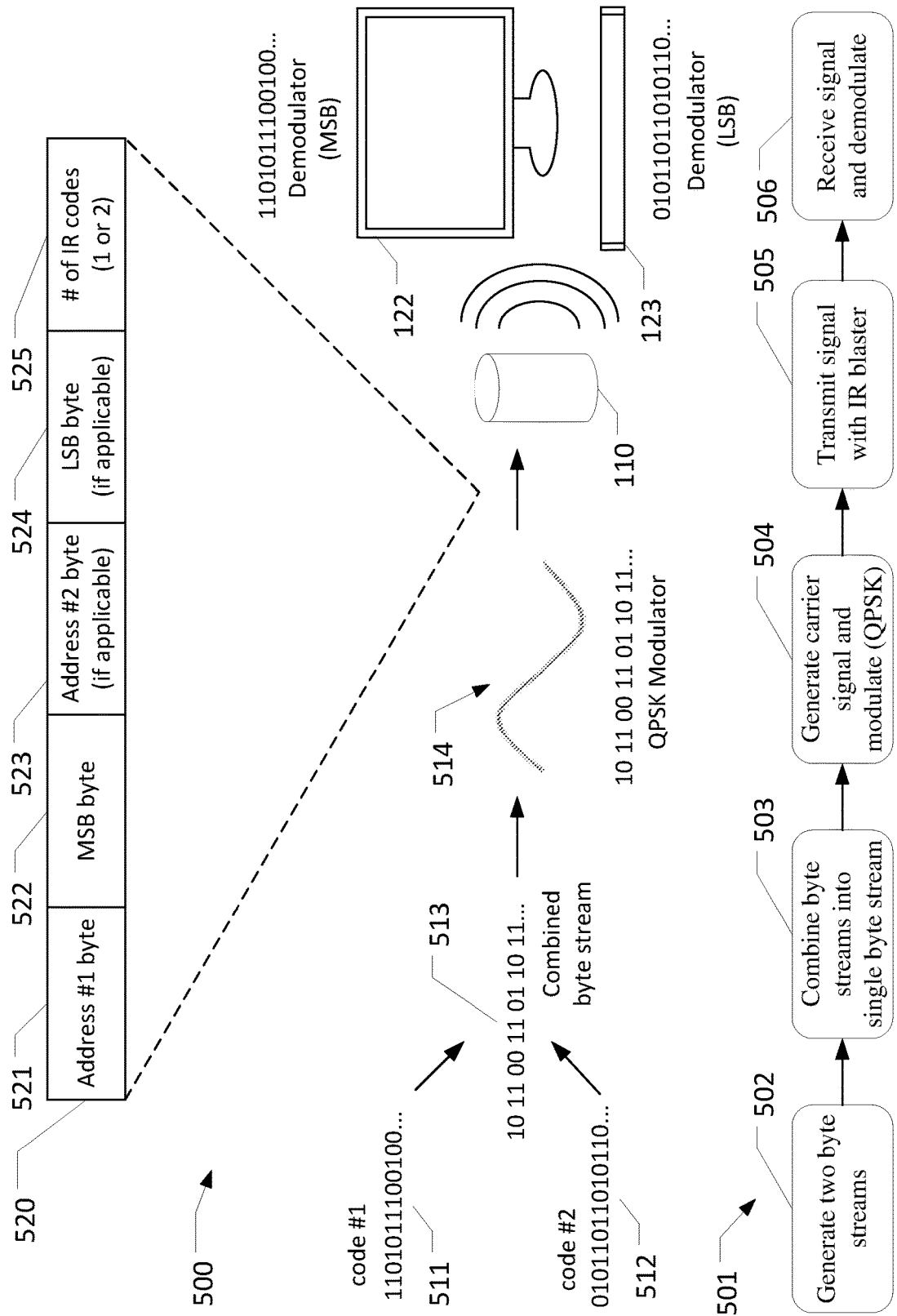
FIG. 5 is a schematic illustration of an example use case for combining two data streams and simultaneously transmitting the two data streams in accordance with one or more example embodiments of the disclosure.

FIG. 5 is a schematic illustration of an example use case 500 for modulating a signal intended for different devices using QSPK and transmitting the signal corresponding to a first byte stream and a second byte stream in accordance with one or more example embodiments of the disclosure. Different embodiments may include different, additional, or fewer entries than those illustrated in the example of FIG. 5.

In FIG. 5, the control device 110 may include at least one memory that stores computer-executable instructions and at least one processor configured to access the at least one memory and execute the computer-executable instructions to perform various actions or operations, such as one or more of the operations in the process 501.

At a first block 502, control device 110 may generate two byte streams. As explained above, this may be accomplished by running code module 628 or code module 728 on control device 110. The first byte stream 511 may correspond to a first code (e.g., IR code) or set of instructions regarding one or more actions, tasks, or actions to be performed by a first electronic device (e.g., television 122). The second byte stream 512 may correspond to a second code (e.g., IR code) or set of instructions regarding one or more actions, tasks, or actions to be performed by a second electronic device (e.g., sound system 123).

Also at block 502 of the process flow 200, computer-executable instructions stored on a memory of a device, such as control device 110, may be executed to generate a handshaking packet 520. Handshaking packet 520 may include address byte 522 that corresponds to an address and/or unique identifier (e.g., MAC address) of a first electronic device 120 (e.g., television 122) as well address byte 523 that corresponds to an address and/or unique identifier of a second electronic device 120 (e.g., sound system 123). The handshaking packet 520 may also include MSB byte 523 that instructs the electronic device 120 corresponding to the first address (e.g., television 122) to demodulate using MSB and LSB byte 523 that instructs the electronic device 120 corresponding to the second address (e.g., sound system 123) to demodulate using LSB, or vice versa. The handshaking packet may further include number of codes byte 525 including information about the number of byte streams of and/or signals corresponding to byte streams that are included in the transmitted signal. The computer executable code executed at block 502 may be code module 628 or code module 728.

At a second block 503, the first byte stream 511 and the second byte stream 512 may be combined into combined byte stream 513. As explained above, the control device 110 may run code combiner module 632 or code combiner module 732 to combine the first byte stream and the second byte stream to generate a combined byte stream 513. At third block 504, a carrier signal may be obtained or generated. For example, the control device 110 may generate a carrier signal using carrier signal generator module 626 or carrier signal generator module 726. Also at block 503, the carrier signal may be modulated using QPSK to encode the combined byte stream 513 and generate a modulated signal 514. Using QPSK the carrier signal may be modulated based on the combined byte stream 513 using 0 and 180 degree phases as well as 90 and 270 degree phases. To modulate using QPSK, the control device may run phase shift keying modulation module 630 or phase shift keying modulation module 730.

At fourth block 505, the modulated signal 514 may be transmitted via the control device 110. For example, control device 110 may run communication module 636 or communication module 736 to transmit the combined modulated signal 514 via transceiver 612 or 712 and antenna 634 or antenna 734, respectively. The signal transmitted at block 505 may be an IR signal and transceiver 612 or transceiver 712 may be IR transmitter. Accordingly, control device 110 may be an IR blaster. The signal transmitted at block 505 may include handshaking packet 520.

At fifth block 506, the modulated signal 514 may be received by electronic devices 120. For example, television 122 and sound system 123 may receive the modulated signal 514. Upon receipt of the modulated signal, each electronic device 120 may demodulate the modulated signal 514 according to the handshaking packet 520. For example, a first device (e.g., television 122) may determine that is an intended recipient of the combined modulated signal according to address byte 521 and may demodulate the modulated signal according to MSB byte 522. Additionally, a second device (e.g., sound system 123) may determine that it is an intended recipient of the combined modulated signal according to address byte 523 and may demodulate the modulated signal according to LSB byte 524. Though control device 650 and television 122 and sound speaker 123 are illustrated in FIG. 5, it is understood that any control device 110 may send the modulated signal 514 to any electronic devices 120.

One or more operations of the methods, process flows, or use cases of FIGS. 1-5 may have been described above as being performed by a control device, or more specifically, by one or more program module(s), applications, or the like executing on a control device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
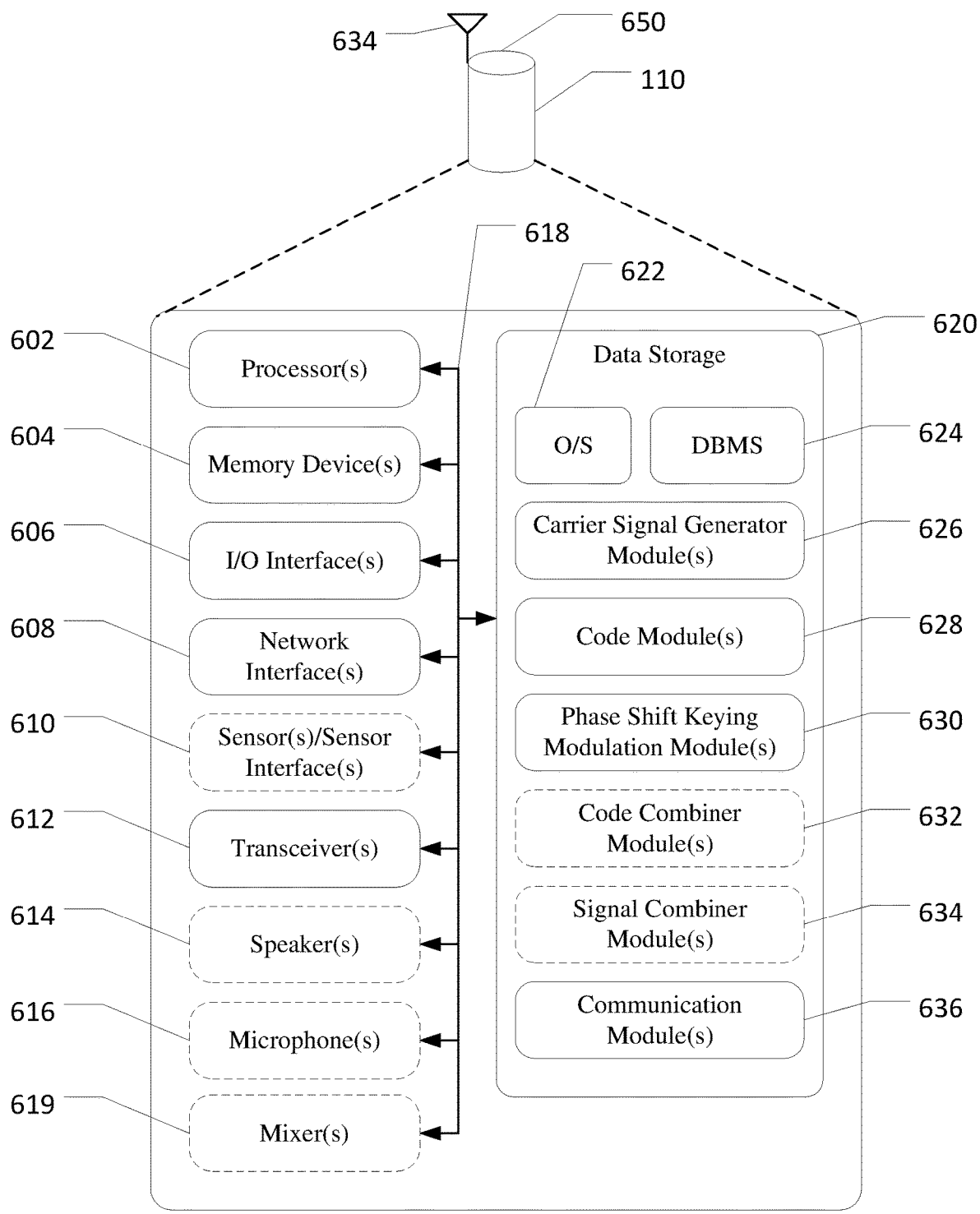
FIG. 6 is a schematic block diagram of an illustrative control device in accordance with one or more example embodiments of the disclosure.

FIG. 6 is a schematic block diagram of an illustrative control device 110 in accordance with one or more example embodiments of the disclosure. Specifically, FIG. 6 is a schematic block diagram of control device 650 which is a control device 110. Control device 650 may be controlled via voice and/or audio commands and may have speech recognition functionality. In one embodiment, smart device 650 may be the Amazon Echo device by Amazon.com, Inc. The control device 110 may include any suitable computing device capable of receiving and/or sending data, and may optionally be coupled to devices including, but not limited to, a mobile device such as a smartphone, tablet, e-reader, wearable device, or the like; a television; a digital tuner; a lighting system; a sound system; a desktop computer; a laptop computer; a content streaming device; a set-top box; or the like. The control device 110 may correspond to an illustrative device configuration for the devices of FIGS. 1-5.

The control device 110 may be configured to communicate via one or more networks with one or more servers, search engines, user devices, or the like. In some embodiments, a single remote server or single group of remote servers may be configured to perform more than one type of action initiation functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration shown in FIG. 6, the control device 110 may include one or more processors 602, one or more memory devices 604 (generically referred to herein as memory 604), one or more input/output (I/O) interface(s) 606, one or more network interface(s) 608, one or more optional sensors or sensor interface(s) 610, one or more transceivers 612, one or more optional speakers 614, one or more optional microphones 616, one or more mixers 619, and data storage 620. The control device 110 may further include one or more buses 618 that functionally couple various components of the control device 110. The control device 110 may further include one or more antenna (e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the control device 110. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the control device 110 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The mixer 619 may be any mixer of merger designed to combine at least two signals and generate a combined signal. For example, mixer 619 may be a mixer designed to combine to modulated signals having the same frequency to generate a combined modulated signal with the same frequency. The mixer 619 may combine the modulated signals in a manner such that the combined signal may be demodulated and information encoded in each of the original two signals may be determined upon demodulating the combined signal. In one example, the original two signals may be modulated using BPSK.

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more carrier signal generator module(s) 626, one or more code module(s) 628, one or more phase shift keying modulation module(s) 630, one or more optional code combiner module(s) 632, one or more optional signal combiner module(s) 634, and/or one or more communication module(s) 636. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the control device 110. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, device pairing information, device library information, user preference information, user action information, user contact data, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the control device 110 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the carrier signal generator module 626 may include computer-executable instructions, code, or the like that responsive to execution by one or more of the processor(s) 602 may perform functions including, but not limited to, generating, receiving and/or obtaining one or more carrier signals, waveforms (e.g., sinusoidal waveforms), carrier waves, and the like. Carrier signal generator module 626 may alter a frequency, wave phase, amplitude, and/or any other features of the carrier signal.

The code module 628 may include computer-executable instructions, code, or the like that responsive to execution by one or more of the processor(s) 602 may perform functions including, but not limited to, generating one or more data streams such as bitstreams or byte streams corresponding to instructions received from a user or from another device. The data streams may be binary and may be processed by electronic device 120 to determine the instructions corresponding to each data stream.

The phase shift keying modulation module 630 includes computer-executable instructions, code, or the like that responsive to execution by one or more of the processor(s) 602 may perform functions including, but not limited to, generating one or more modulated signals thereby encoding a carrier signal according to a data stream such as a bitstream or a byte stream. Phase shift keying modulating may modulate a carrier signal using BPSK and certain phase pairs (e.g., 0 and 180 degrees; 90 and 270 degrees). Alternatively, phase shift keying may modulate a carrier signal using QPSK and phases such as 0, 90, 180 and 270 degrees. While phases such as 0, 90, 180 and 270 degrees are described above, it is understood that different phases may be used such as 45, 135, 225, and 315 degrees.

The code combiner module 632 includes computer-executable instructions, code, or the like that responsive to execution by one or more of the processor(s) 602 may perform functions including, but not limited to, combining two or more data streams such as bit streams or bit streams. Code combiner module 628 and code combiner module 728 may be designed to take two separate byte streams and combine them into a merged byte stream having two bits per piece. For example, in combining a first byte stream and a second byte stream, each bit of the first byte stream may be merged with a corresponding bit of a second byte stream such that the values are merged into a plurality of bit pairs with one bit from the first byte stream and the other bit from the second byte stream (e.g., 00, 01, 10, and 11).

The signal combiner module 634 may work together with optional mixer 619 and may include computer-executable instructions, code, or the like that responsive to execution by one or more of the processor(s) 602 may perform functions including, but not limited to, combining two modulated signals having the same frequency to generate a combined modulated signal with the same frequency as described above with respect to mixer 619.

The communication module(s) 636 may include computer-executable instructions, code, or the like that responsive to execution by one or more of the processor(s) 602 may perform functions including, but not limited to, communicating with one or more devices, for example, via wired or wireless communication, communicating with user devices, communicating with remote servers such as servers 140, communicating with electronic devices 120, and/or remote datastores, sending or receiving modulated signals, notifications or commands/directives, communicating with cache memory data, communicating with user devices, and the like.

Referring now to other illustrative components depicted as being stored in the data storage 620, the O/S 622 may be loaded from the data storage 620 into the memory 604 and may provide an interface between other application software executing on the control device 110 and hardware resources of the control device 110. More specifically, the O/S 622 may include a set of computer-executable instructions for managing hardware resources of the control device 110 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the control device 110 is a mobile device, the DBMS 624 may be any suitable light-weight DBMS optimized for performance on a mobile device.

Referring now to other illustrative components of the control device 110, the input/output (I/O) interface(s) 606 may facilitate the receipt of input information by the control device 110 from one or more I/O devices as well as the output of information from control device 110 to the one or more I/O devices. The I/O devices may include any of a variety of components such as a display or display screen (e.g., having a touch surface or touchscreen); button or sliders that may pressed or otherwise engaged by a user; an audio capture device, such as a microphone; an image and/or video capture device, such as a camera; a haptic unit; and so forth. Any of these components may be integrated into the control device 110 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The control device 110 may further include one or more network interface(s) 608 via which the control device 110 may communicate with any of a variety of other systems, platforms, networks, devices including electronic device 120, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the control device 110 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the control device 110. The transceiver(s) 612 may further include a low noise amplifier (LNA), additional signal amplifiers, an analog-to-digital (A/D) converter, one or more buffers, a digital baseband, or the like.

The optional sensor(s)/sensor interface(s) 610 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. The optional speaker(s) 614 may be any device configured to generate audible sound. The optional microphone(s) 616 may be any device configured to receive analog sound input or voice data, and may include noise cancellation functionality.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the control device 110, and/or hosted on other computing device(s) accessible via one or more networks, may be provided to support functionality provided by the program module(s), applications, or computer-executable code depicted in FIG. 6 and/or additional or alternative functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

Figure 7:
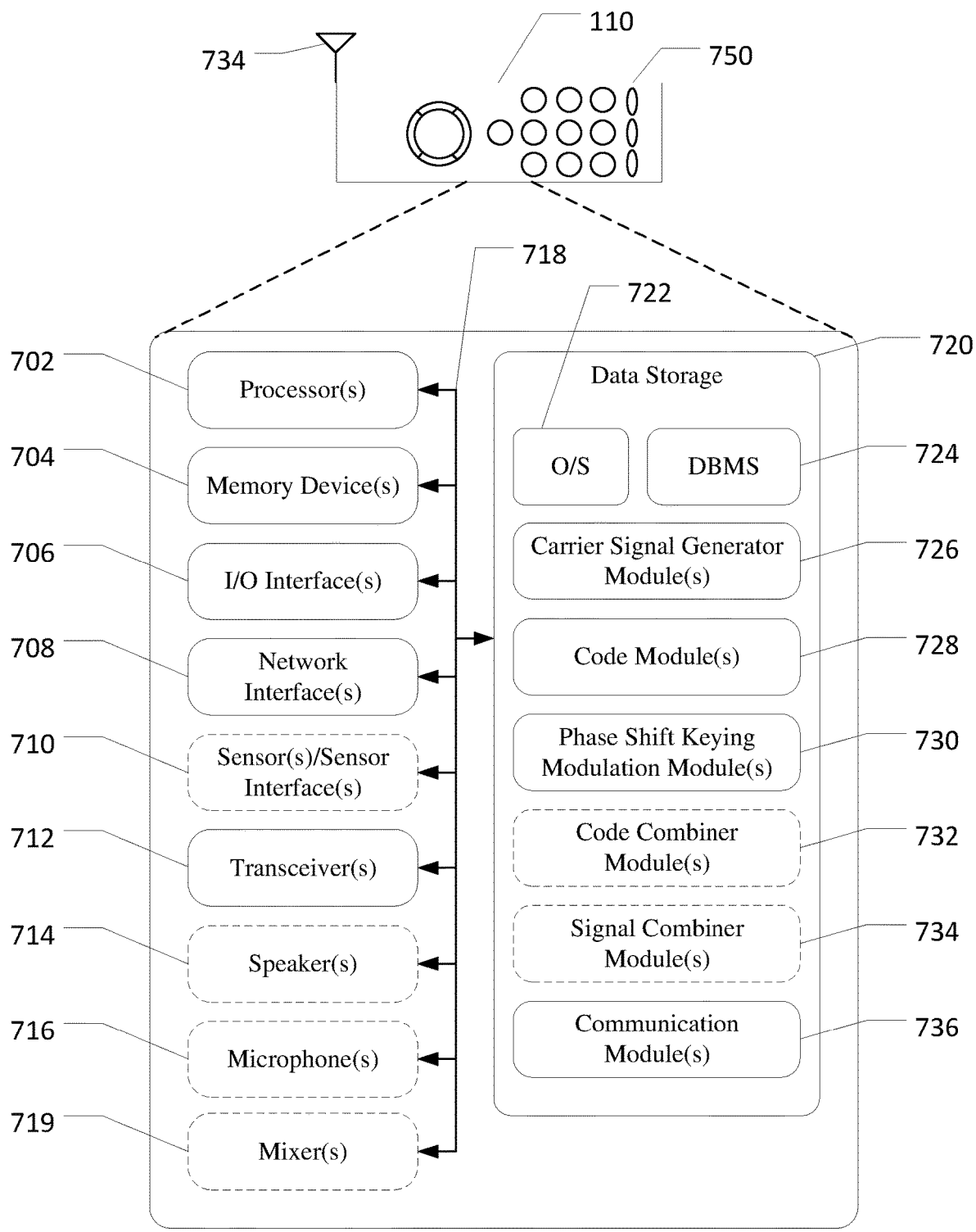
FIG. 7 is a schematic block diagram of another illustrative control device in accordance with one or more example embodiments of the disclosure.

FIG. 7 is a schematic block diagram of an illustrative control device 110 in accordance with one or more example embodiments of the disclosure. Specifically, FIG. 7 is a schematic block diagram of control device 750 which is a control device 110. 750 may be remote control device having a plurality of buttons, a touchscreen and/or sliders that may be pressed and/or engaged by a user to input data. Control device 750 may have the same or substantiality the same schematic block diagram as FIG. 6 and may have the same or substantiality the same functionality and perform the same or substantially the same operations as control device 650 described herein with respect to FIG. 6.

In an illustrative configuration shown in FIG. 7, the control device 750 may include one or more processors (processor(s)) 702 which may be the same as processor(s) 602, one or more memory devices 704 which may be may be the same as memory device 604, one or more input/output (I/O) interface(s) 706 which may be the same as input/output (I/O) interface(s) 606, one or more network interface(s) 708 which is the same as network interface(s) 608, one or more optional sensors or sensor interface(s) 710 which may be the same as optional sensors or sensor interface(s) 610, one or more transceivers 712 which may be the same as transceivers 612, one or more optional speakers 714 which may be the same as optional speakers 614, one or more optional microphones 716 which may be the same as optional microphones 616, one or more mixers 719 which may be the same as mixers 619, and data storage 720 which may be the same as data storage 620. The control device 750 may further include one or more buses 718 which may be the same as buses 618 and antenna 734 which may be the same as antenna 634. Further, the data storage 620 may store one or more operating systems (O/S) 722 which may be the same as operating system 622; one or more database management systems (DBMS) 724 which may be the same as DBMS 624; and one or more program module(s), applications, engines, computer-executable code, scripts, or the like such as, for example, one or more carrier signal generator module(s) 726 which may be the same as carrier signal generator module(s) 626, one or more code module(s) 728 which may be the same as code module(s) 628, one or more phase shift keying modulation module(s) 730 which may be the same as phase shift keying modulation module(s) 630, one or more code combiner module(s) 732 which may be the same as code combiner module(s) 632, one or more signal combiner module(s) 734 which may be the same as signal combiner module(s) 634, and/or one or more communication module(s) 736 which may be the same as communication module(s) 636.

Figure 8:
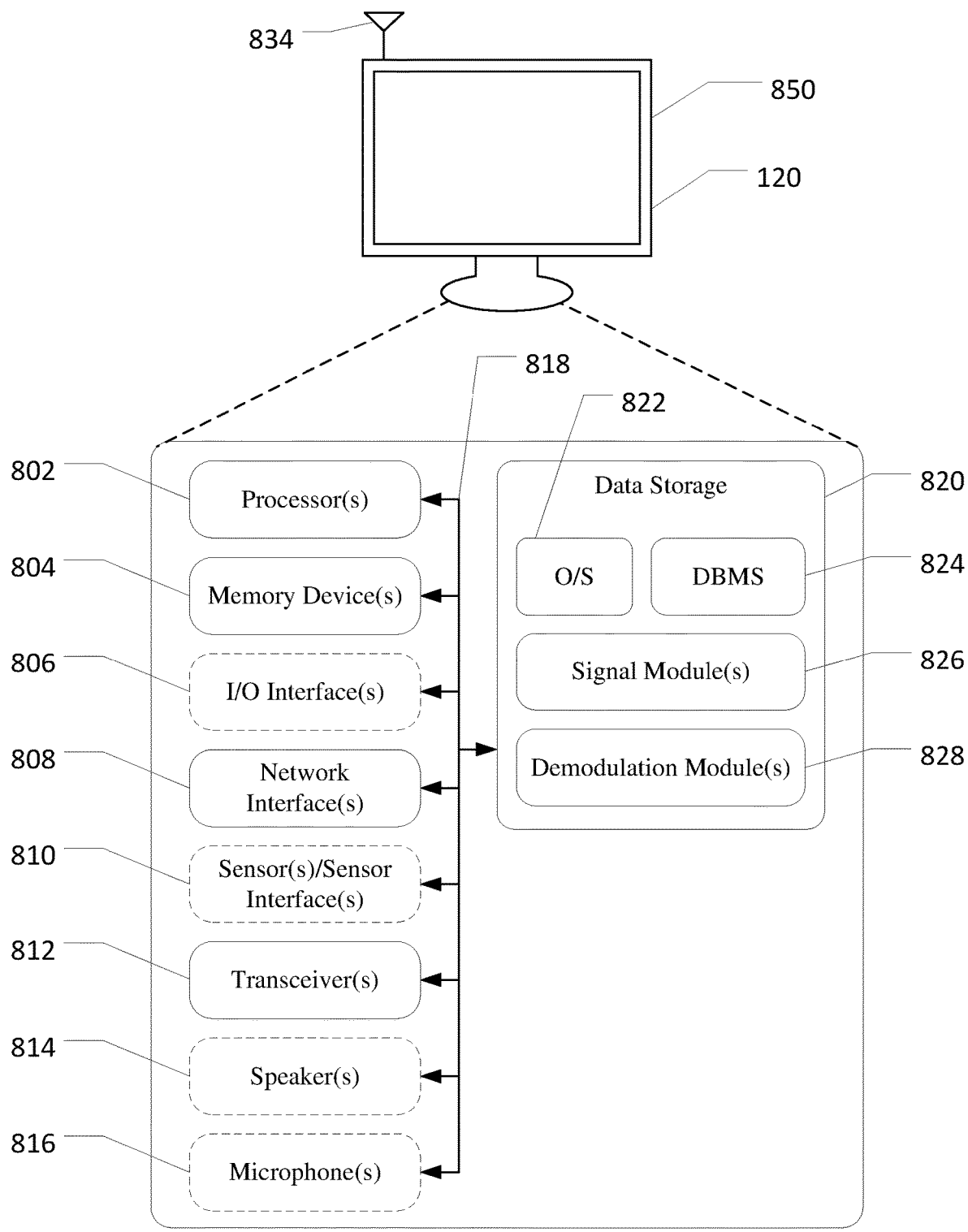
FIG. 8 is a schematic block diagram of an illustrative electronic device in accordance with one or more example embodiments of the disclosure.

FIG. 8 is a schematic block diagram of an illustrative electronic device 120 in accordance with one or more example embodiments of the disclosure. Specifically, FIG. 8 is a schematic block diagram of electronic device 850, which is a control device 110. Electronic device 120 may be an electronic device that may receive signals from a control device such a control device 110. Electronic device 120 may demodulate received signals and may perform an action, task, and/or operation based on the demodulated signal. Electronic device 850 may be, for example, a television, computing device, speaker system involving one or more speakers, lighting system involving one or more lights, digital tuner or cable box, and/or other devices that may receive and process signals (e.g., garage door openers, security systems, etc.).

In an illustrative configuration shown in FIG. 8, the electronic device 850 may include one or more processors (processor(s)) 802 which may be the same as or substantially similar to processor(s) 602, one or more memory devices 804 which may be may be the same as or substantially similar to memory device 604, one or more optional input/output (I/O) interface(s) 806 which may be the same as or substantially similar to input/output (I/O) interface(s) 606 and which may include one or more displays, one or more network interface(s) 808 which may be the same as or substantially similar to network interface(s) 608, one or more optional sensors or sensor interface(s) 810 which may be the same as or substantially similar to optional sensors or sensor interface(s) 610, one or more transceivers 812 which may be the same as or substantially similar to transceivers 612, one or more optional speakers 814 which may be the same as or substantially similar to optional speakers 614, one or more optional microphones 816 which may be the same as or substantially similar to optional microphones 616, and data storage 820 which may be the same as or substantially similar to data storage 620. The control device 850 may further include one or more buses 818, which may be the same as or substantially similar to buses 618 and antenna 834 which may be the same as or substantially similar to antenna 634.

Further, the data storage 820 of electronic device 860 may store one or more operating systems (O/S) 822 which may be the same as or substantially similar to operating system 622; one or more database management systems (DBMS) 724 which may be the same as or substantially similar to DBMS 624; and one or more program module(s), applications, engines, computer-executable code, scripts, or the like such as, for example, one or more signal module(s) and/or one or more demodulation module(s).

The signal module(s) 826 may include computer-executable instructions, code, or the like that responsive to execution by one or more of the processor(s) 802 may perform functions including, but not limited to, receiving a signal sent from a control device 110 and analyzing and/or processing a handshaking packet, reset packet, or other instructional packet to determine instructions relevant to electronic device 850. As explained above, the handshaking packet may identify intended recipients of the signal, may identify methods of demodulation (e.g., demodulation using phase pairs, demodulation using MSB/LSB, etc.) and/or the number of codes or byte streams in the signal. The signal module(s) may process the reset packet and determine to return to default settings such as a default modulation technique.

The demodulation module(s) 828 may include computer-executable instructions, code, or the like that responsive to execution by one or more of the processor(s) 802 may perform functions including, but not limited to, demodulating the received signal. The handshaking packet may instruct the electronic device 850 to demodulate the signal using a certain demodulation technique. For example, the handshaking packet may instruct the electronic device to demodulate the signal using phase pairs (e.g., 90 and 180 degrees), MSB, or LSB. The demodulation module(s) 828 may then demodulate the signal based on the information in the handshaking packet.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device 120, and/or hosted on other computing device(s) accessible via one or more networks, may be provided to support functionality provided by the program module(s), applications, or computer-executable code depicted in FIG. 8 and/or additional or alternative functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the control device 110 and/or electronic device 120 may include alternative and/or additional hardware, software, or firmware components beyond those described or depicted without departing from the scope of the disclosure. More particularly, it should be appreciated that software, firmware, or hardware components depicted as forming part of the control device 110 and/or electronic device 120 are merely illustrative and that some components may not be present or additional components may be provided in various embodiments. While various illustrative program module(s) have been depicted and described as software module(s) stored in data storage 620 and data storage 720, or as data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier signal, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    determining, at a control device, a first action to be implemented at a first device and a second action to be implemented at a second device;
    generating, at the control device, a first byte stream corresponding to the first action and a second byte stream corresponding to the second action;
    determining, at the control device, two carrier signals, each of the two carrier signals having a first frequency;
    modulating, at the control device, the two carrier signals to generate two modulated signals;
    combining, at the control device, the two modulated signals into a combined modulated signal having the first frequency; and
    transmitting, at the control device, the combined modulated signal including the first byte stream and the second byte stream.

2. The method of claim 1, further comprising generating an original carrier signal and wherein determining the two carrier signals comprises splitting the original carrier signal into the two carrier signals.

3. The method of claim 1, wherein modulating each of the two carrier signals comprises modulating each of the two carrier signals using binary phase shift keying (BPSK) such that bits of the first byte stream are represented by a first phase and a second phase and bits of the second byte stream are represented by a third phase and a fourth phase.

4. The method of claim 3, wherein the first phase is 0 degrees, the second phase is 180 degrees, the third phase is 90 degrees and the fourth phase is 270 degrees.

5. The method of claim 4, wherein combining the two modulated signals into a combined modulated signal comprises combining the two modulated signals using a mixer adapted for combining two modulated signals modulated using different phase pairs.

6. The method of claim 1, wherein modulating each of the two carrier signals comprises encoding a first carrier signal of the two carrier signals with the first byte stream and encoding a second carrier signal of the two carrier signals with the second byte stream.

7. The method claim 6, wherein the first byte stream and the second byte stream are encoded using phase shift keying such that the first byte stream is represented by a first phase of 0 degrees as well as a second phase of 180 degrees, and the second byte stream is represented by a third phase of 90 degrees as well as a fourth phase of 270 degrees.

8. The method of claim 1, further comprising determining a handshaking packet, including:
    determining a first address byte corresponding to an address of the first device;
    determining a first phase byte corresponding to a first phase pair to be used by the first device;
    determining a second address byte corresponding to an address of the second device;
    determining a second phase byte corresponding to a second phase pair to be used by the second device; and
    determining a stream number corresponding to a number of byte streams in the combined modulated signal.

9. The method of claim 8, wherein the handshaking packet causes the first device to demodulate the combined modulated signal using the first phase pair and causes the second device to demodulate the combined modulated signal using the second phase pair.

10. The method of claim 1, further comprising:
    requesting, at the control device, a first address corresponding to the first device and a second address corresponding to the second device from a server; and
    receiving, at the control device, the first address and the second address from the server.

11. The method of claim 1, further comprising:
    pairing, by the control device, with the first device and the second device; and determining, at the control device, a first address corresponding to the first device and a second address corresponding to the second device.

12. A control device comprising:
  memory configured to store computer-executable instructions, and
  at least one computer processor configured to access memory and execute the computer-executable instructions to:
    determine a first action to be implemented at a first device and a second action to be implemented at a second device;
    generate a first byte stream corresponding to the first action and a second byte stream corresponding to the second action;
  determine two carrier signals, each of the two carrier signals having a first frequency;
    modulate the two carrier signals to generate two modulated signals;
    combine the two modulated signals into a combined modulated signal having the first frequency; and
    transmit the combined modulated signal including the first byte stream and the second byte stream.

13. The control device of claim 12, wherein the at least one computer processor is further configured to generate an original carrier signal and wherein the two carrier signals are determined by at least splitting the original carrier signal into the two carrier signals.

14. The control device of claim 12, wherein the computer-executable instructions to modulate each of the two carrier signals comprises instructions to modulate each of the two carrier signals using binary phase shift keying (BPSK) such that bits of the first byte stream are represented by a first phase and a second phase and bits of the second byte stream are represented by a third phase and a fourth phase.

15. The control device of claim 14, wherein the first phase is 0 degrees, the second phase is 180 degrees, the third phase is 90 degrees and the fourth phase is 270 degrees.

16. The control device of claim 15, wherein the computer-executable instructions to combine the two modulated signals into a combined modulated signal comprises instructions to combine the two modulated signals using a mixer adapted for combining two modulated signals modulated using different phase pairs.

* * * * *